United States Patent [19]

Eberly, Jr.

[11] 4,166,046

[45] Aug. 28, 1979

[54] REFORMING WITH MULTIMETALLIC CATALYSTS

[75] Inventor: Paul E. Eberly, Jr., Baton Rouge, La.

[73] Assignee: Exxon Research & Engineering Co., Florham Park, N.J.

[21] Appl. No.: 873,519

[22] Filed: Jan. 30, 1978

Related U.S. Application Data

[63] Continuation-in-part of Ser. No. 862,116, Dec. 19, 1977, which is a continuation-in-part of Ser. No. 826,996, Aug. 23, 1977, abandoned.

[51] Int. Cl.$^2$ .......................... B01J 27/02; B01J 27/00
[52] U.S. Cl. ...................................... 252/439; 252/434; 208/139
[58] Field of Search .............................. 252/434, 439

[56] References Cited

U.S. PATENT DOCUMENTS

| | | | |
|---|---|---|---|
| 2,851,399 | 9/1958 | Brennan et al. | 252/466 PT |
| 3,554,902 | 1/1971 | Buss | 252/439 X |
| 3,649,704 | 3/1972 | Hayes | 252/439 X |
| 3,660,271 | 5/1972 | Keith et al. | 252/439 X |
| 3,761,426 | 9/1973 | Wilhelm | 252/439 |
| 3,790,473 | 2/1974 | Rausch | 252/439 X |
| 3,884,799 | 5/1975 | Mahoney et al. | 252/439 X |
| 3,936,369 | 2/1976 | Hayes | 252/439 X |
| 3,968,053 | 7/1976 | Rausch | 252/439 |

Primary Examiner—Delbert E. Gantz
Assistant Examiner—William G. Wright
Attorney, Agent, or Firm—L. A. Proctor

[57] ABSTRACT

A catalyst composition, and process, useful in reforming a hydrocarbon feed at reforming conditions without excessive hydrogenolysis, a phenomenon which is normally particularly acute during the startup of a reactor. The catalyst is constituted of a composite which includes a Group VIII noble metal hydrogenation-dehydrogenation component, notably platinum, iridium, and selenium. Hydrogenolysis is suppressed, and significantly greater yields of higher octane $C_5+$ liquid product are obtained by contact of the selenium promoted iridium-containing catalyst with oxygen prior to contact of the catalyst with a hydrocarbon fraction at reforming conditions. Suitably, the oxygen pretreatment is conducted by contact of the catalyst with an oxygen containing gas at elevated temperatures.

7 Claims, No Drawings

REFORMING WITH MULTIMETALLIC CATALYSTS

This is a continuation-in-part of application Ser. No. 862,116 filed Dec. 19, 1977, which in turn is a continuation-in-part of application Ser. No. 826,996, filed Aug. 23, 1977 now abandoned.

Catalytic reforming, or hydroforming, is a well-known type of process employed in the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is cocurrently passed sequentially through a reheat furnace and then to the next reactor of the series. The vapor effluent from the last reactor of the series is a gas rich in hydrogen, which usually contains small amounts of normally gaseous hydrocarbons, and it is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group or Group VIII noble metals (ruthenium, osmium, rhodium, iridium, palladium and platinum) despite their expense have been recognized as having a combination of properties which make them particularly suitable for reforming operations, and hence certain of these species of catalysts have become widely used in commercial operations. Conventional reforming catalysts have thus long employed platinum composited with an inorganic oxide base, particularly alumina, and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Halogen, e.g., chlorine, is generally added to enhance the acid function required of the catalyst.

The principal reactions produced in reforming are: (1) dehydrogenation of naphthenes to produce the corresponding aromatic hydrocarbons, e.g., methylcyclohexane is dehydrogenated to form toluene, (2) isomerization of n-paraffins to form branched-chain paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling, constituents, e.g., the cracking of n-decane to produce $C_3$ and $C_7$ hydrocarbons. The net effect of these reactions is to increase the concentration of aromatics and isomers, with consequent octane improvement of naphthas boiling within the gasoline range.

Hydrogenolysis, a specific and severe form of hydrocracking which produces methane can also occur, and is particularly acute in reforming with the new "multimetallic" catalysts, e.g., platinum-rhenium, platinum-iridium, etc., particularly fresh or regenerated, reactivated catalysts of such type, which are particularly hypersensitive. Exotherms or heat fronts are produced which pass through a catalyst bed at startup, i.e., when new or freshly regenerated, reactivated catalyst is initially contacted with hydrocarbons at reforming temperatures. The temperature excursions or heat fronts are attributed to the hyperactivity of the catalyst which causes excessive hydrocracking of the hydrocarbons, or hydrogenolysis, sometimes referred to as "runaway hydrocracking." These temperature excursions or heat fronts are undesirable because the resultant temperature often results in damage to the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other type of reforming units, hydrogenolysis, or runaway hydrocracking greatly reduces the efficiency of the cyclic reforming process and simply cannot be tolerated. In fact, because of this problem some of the newer more highly active promoted platinum catalysts, i.e., multimetallic catalysts, are unsuitable in cyclic reforming processes.

It is conventional to presulfide a noble metal reforming catalyst prior to its use in reforming to suppress hydrogenolysis, or runaway hydrocracking, which can cause excessive methane formation, hot spots, temperature excursions, and the like. In presulfiding, it is conventional to charge catalyst into a reactor for contact with an admixture of hydrogen sulfide and an inert gas, e.g., nitrogen. Various difficulties, however, are associated with this practice. One difficulty of such technique, e.g., is that the sulfur is not deposited uniformly on the catalyst. The catalyst at the top of the reactor is heavily sulfided and only lightly sulfided near the bottom of the reactor. Only by sulfiding to the point of breakthrough can the catalyst at the bottom of the reactor be adequately sulfided, this causing the catalyst on the top of the reactor to be over-sulfided. Whereas this non-uniformity and over-sulfiding of the catalyst does not create particularly difficult problems in the use of un-promoted platinum catalysts, it produces particularly acute problems with the new multimetallic catalyst species. Excess sulfur is converted into hydrogen sulfide which is picked up by the recycle gas such that it contaminates the entering feed. This, because of the high sulfur sensitivity of these catalysts, results in more rapid catalyst deactivation and loss of $C_5+$ liquid yields. Moreover, during regeneration, some of the sulfur is oxidized to sulfur dioxide and sulfur trioxide which forms corrosive acids with water introduced into the process and contributes to sulfation of the inorganic oxide or alumina base, resulting in loss of surface area and activity.

Another problem is that the new, fresh, or regenerated multimetallic catalysts, especially iridium-containing catalysts, and notably platinum-iridium catalysts, become rapidly overheated when exposed, in the presence of hydrogen, at normal reaction conditions to hydrocarbons, which can crack to produce methane, ethane, propane and butane, to such extent that the catalyst itself can be overheated, sintered or otherwise damaged.

In U.S. Pat. No. 3,884,799 to Mahoney et al, which issued May 20, 1975, there is disclosed a catalyst, and process for using such catalyst for reforming a petroleum hydrocarbon fraction at conventional reforming conditions, which is constituted of a Group VIII noble metal, notably platinum, and rhenium and selenium composited on a refractory inorganic oxide, notably alumina, to which is added a halogen component, notably a chloride. This reference discusses the problem of hydrogenolysis which occurs in reforming during start-up with an unsulfided, or improperly sulfided, halogenated platinum-rhenium catalyst, and it discloses and claims the process of using a catalyst in reforming in which selenium is incorporated therein thereby reducing coke formation and eliminating any necessity of a pre-sulfiding treatment of that particular catalyst to suppress hydrogenolysis during start-up. Moreover, it is suggested that an substantial amount of the selenium is retained on the catalyst during reforming, and subsequently after the catalyst has been subjected to an appreciable number of simulated regeneration cycles. This provides advantages in that the catalyst need not be retreated after each regeneration, and presulfiding of the catalyst becomes unnecessary. U.S. Pat. No. 2,851,399 to Brennan et al also discloses a reforming catalyst containing platinum and selenium composited with alumina useful in reforming but, inter alia, there is no suggestion of a third hydrogenation-dehydrogenation component.

In application Ser. No. 862,116, supra, there is further disclosed a catalyst, and process embodying the use of such catalyst in reforming a hydrocarbon faction, wherein selenium, or a compound or salt of selenium, is incorporated within iridium-containing reforming catalysts, notably platinum-iridium catalysts, at the time of preparation. The present invention is one which provides further improvements over the catalyst composition, and process for the use of said catalyst disclosed therein. The present catalyst, and process, like that disclosed in application Ser. No. 862,116 obviates the aforesaid prior art deficiencies and provides the art with a new and improved startup process for upgrading naphthas to produce higher octane gasolines, while minimizing hydrogenolysis; and additional benefits.

It has now been discovered, inter alia, that significantly greater yields of $C_5+$ liquid product, particularly $C_5+$ liquid product of higher octane, can be obtained by pretreatment, exposure or contact of a selenium promoted iridium-containing catalyst, notably a selenium promoted platinum-iridium catalyst, with oxygen prior to contact of the catalyst with a hydrocarbon fraction at reforming conditions. Suitably, the oxygen pretreatment is conducted by contact of the selenium promoted iridium-containing catalyst with an oxygen containing fluid, preferably a gaseous mixture containing from about 0.1 percent to about 100 percent oxygen, more preferably from about 0.5 percent to about 30 percent oxygen, based on the total volume of the fluid. Suitably, the oxygen pretreatment of the catalyst is continued for a period ranging from about 0.1 to about 48 hours, preferably from about 0.5 to about 24 hours at temperatures ranging from about 300° F. to about 1200° F., preferably from about 600° F. to about 1000° F. Air, or oxygen enriched air, is a preferred pretreating agent because of its low cost and availability, but various other oxygen containing gases can be employed, particularly inert or non-reactive gases admixed with oxygen. That the selectivity of the catalyst could be improved by treatment of the catalyst with oxygen in this manner is indeed surprising for it is well known that iridium-containing catalysts are particularly sensitive, and adversely affected by contact with oxygen at elevated temperature. Exposure of iridium-containing catalysts to oxygen at elevated temperature thus normally results in agglomeration of the iridium and loss in the yield and activity of the catalyst.

The catalyst or catalyst composite is one comprising a refractory or inorganic oxide support material, particularly alumina, a Group VIII noble metal hydrogenation-dehydrogenation component, notably platinum, to which both iridium and selenium have been added to promote the activity and selectivity of the catalysts, and said catalyst is thereafter pretreated with oxygen in the aforesaid manner. Suitably, the reforming catalyst, or composite also contains a halogen component, particularly chlorine, and preferably the selenium component is introduced into the support, or catalyst, by impregnating same with a solution comprising selenium as an element, or a salt or compound thereof. Exemplary of compounds suitable for the addition of selenium to the catalyst composite are selenium monochloride, selenium disulfide, selenium sulfuroxytetrachloride, selenous acid, selenic acid, selenium tetrachloride, and the like.

The incorporation of selenium into the catalyst at the time of its formation, though the reasons therefor are not as yet completely understood, obviates any need for in situ sulfiding of the catalyst with $H_2S$ as in conventional practice. The selenium, remains within the catalyst throughout the operation suppressing hydrogenolysis, and yet does not create the problems associated with conventional catalyst sulfiding. The presence of selenium within the catalyst not only suppresses hydrogenolysis but additionally enhances the reforming characteristics of the catalyst, particularly after pretreatment with oxygen.

In accordance with this invention, a porous refractory inorganic oxide support is employed as a suitable impregnation material. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g.$, preferably from about 100 to about 300 $m^2/g.$, a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metallic component of the Group VIII noble metals of the Periodic Table of the Elements necessarily includes iridium, and one or more platinum group metal components such as ruthenium, rhodium, palladium, osmium, platinum, and the like. Of these latter class of metals, platinum is the preferred component, and platinum-iridium catalysts are the preferred species of catalysts; and there can be further promoted to increase the normally expected activity and selectivity of these catalysts.

The additional metallic component, or components, is suitably a component selected from the Group IV (Ge, Sn, Pb) metals, Group VI (Cr, Mo, W) metals, Group VII metals, and Group VIII metals. For example, germanium, tin, lead, osmium, ruthenium, or rhodium can be used. Although one or more of these components can be added by any of the conventional methods, it is preferably to add them by an impregnation prior to, following or simultaneously with the impregnation of the Group VIII noble metal, iridium, selenium or halogen components. The promoter metals are added in concentration ranging about 0.01 to 3 percent, preferably from about 0.02 to about 1 percent, based on the weight of the catalyst.

The metal hydrogenation components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or ammonium carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or non-agglomerating atmosphere. The metal hydrogenation components can also be added to the catalyst by impregnation, typically via an "incipient wetness" technique which requires a minimum of solution so that the total solution is absorbed, initially or after some evaporation.

It is generally preferred, however, to deposit the Group VIII noble metal, or metals, iridium and metals used as promoters, on a previously pilled, pelleted, beaded extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

The Group VIII noble metal component, and also iridium which is a Group VIII noble metal, is supported on the carrier within the range of from about 0.01 to 3 percent, preferably from about 0.05 to 1 percent, based on the weight of the catalyst. In compositing the Group VIII noble metal with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where the Group VIII noble metal is platinum, platinum chloride, platinum nitrate, chloroplatinic acid, ammonium chloroplatinate, potassium chloroplatinate, platinum polyamine, platinum acetylacetonate, and the like, are preferably used.

The impregnation solution of the noble metal compound, and metals used as promoters, are prepared by dissolving the compounds in water or any other inorganic or organic solvent. The concentration of the metallic component ranges from about 0.01 to 5 percent, preferably from about 0.05 to 1 percent, based on the weight of solution. The pH of the impregnation solution should be controlled to less than about 4, preferably less than 3, by the addition of a suitable inorganic or organic acid. By controlling the pH within these ranges, the components can be effectively dispersed into the inner part of the catalyst. Generally, it is preferred to use a halogen-acid aqueous solution of the noble metals.

In accordance with this invention, the selenium is incorporated into the catalyst at the time of its formation and preferably selenium is incorporated by impregnation of a solution of a soluble salt, acid or compound of selenium into the carrier. This can be carried out simultaneously with, prior to, or following the impregnation of the hydrogenation-dehydrogenation component, or components, into the carrier. Selenium, in accordance with this invention, can be added to the carrier from a solution which contains both the salt, acid or compound of selenium, the Group VIII noble metal hydrogenation-dehydrogenation component, or components, iridium, and the inorganic acid such as HCl. Suitably, the salts or compounds are dissolved in a suitable solvent, preferably water, to form a solution, or each moiety is separately dissolved in a solution, the solutions admixed and the admixed solution used for impregnation of the carrier.

The concentration of the salt or compound of selenium in the impregnation solution ranges from about 0.01 to 2 percent, preferably from about 0.01 to 1 weight percent, based on the weight of the solvent; this concentration being adequate to impregnate generally from about 0.001 to about 3 percent, preferably from about 0.01 to about 1 percent of the selenium within the catalyst.

The impregnation of the Group VIII noble metal, iridium, and selenium components into a carrier is carred out by impregnating the carrier with the solution of the respective salts or compounds of the elements or metals to be incorporated. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

In a preferred embodiment of the present invention a carrier can be impregnated with an aqueous halogen-acid solution of the Group VIII noble metal, iridium and other compounds, if any, followed by evaporation or filtration and then drying or calcination, or both, and then the metals impregnated catalysts can be impregnated with a solution containing a dissolved salt or compound of selenium followed by evaporation or filtration and then drying or calcination, or both, whereby the selenium component can be dispersed substantially uniformly to the inner part of the catalyst.

To enhance catalyst performance, it is also required to add a halogen component. Fluorine and chlorine are preferred halogen components. The halogen is contained on the catalyst within the range of 0.1 to 3 percent, preferably within the range of about 0.3 to 2 percent, based on the weight of the catalyst. When using chlorine as a halogen component, it is contained on the catalyst within the range of about 0.2 to 2 percent, preferably within the range of about 0.5 to 1.5 percent; based on the weight of the catalyst. The introduction of halogen into catalyst can be carried out by any method and at any time of the catalyst preparation, for example, prior to, following or simultaneously with the impregnation of the noble metal, iridium, or selenium components. In the usual operation, the halogen component is introduced simultaneously with the incorporation of the noble metal component. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
| --- | --- | --- |
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, W/W/Hr | 0.5–10 | 1–3 |

The invention will be more fully understood by reference to the following non-limiting demonstrations and examples which present comparative data which illustrate its more salient features. All parts are given in terms of weight except as otherwise specified.

EXAMPLES

A high surface area gamma-alumina was calcined in a muffle furnace for three hours at 800° F. in an air atmosphere. This alumina was then impregnated with an aqueous solution of chloroplatinic acid, chloroiridic acid, hydrogen chloride, and selenous acid. The catalyst was then dried in a vacuum oven at 300° F. to produce a final material having the following composition, to wit:

| Components | % by Weight |
| --- | --- |
| Platinum | 0.3 |
| Iridium | 0.3 |
| Chlorine | 0.9 |
| Selenium | 0.037 |
| Alumina | 98.5 |

The above catalyst was then divided into two portions. The first portion was used as such with no further calcination and was labelled Catalyst A. The second portion was calcined for a period of 16 hours with air at 900° F. and atmospheric pressure. This was designated as Catalyst B. Each catalyst was then packed into a reactor and then contacted at reforming condition in separate runs with a commercially available low sulfur paraffinic naphtha, characterized in Table I as having the following inspections:

TABLE I

| ASTM Distillation, °F. | |
| --- | --- |
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No., RON Clear | 34.8 |
| Gravity, °API | 59.7 |
| Sulfur, Wt. ppm | <0.1 |
| Analysis, Vol. Percent | |
| Paraffins | 69.509 |
| Naphthenes | 18.411 |
| Aromatics | 12.08 |

The reforming runs were carried out to produce an approximately 100 RON liquid product, i.e., at 910° F., 200 PSIG, 5000 SCF/Bbl and 2.1 W/Hr/W with each of the catalysts. The results are given in Table II.

TABLE II

| Reforming of Fos Paraffinic Naphtha (<0.1 ppm S) @910° F., 200 psig and 2.1 W/H/W | | | |
| --- | --- | --- | --- |
| | $C_5+$ Yield @ 100 RON, Vol. % | | |
| Catalyst | @6 Hours | @30 Hours | @175 Hours |
| A | 62.7 | 67.3 | 67.9 |
| B | 68.9 | 73.6 | 73.0 |

This outstanding increase in yield resulting from the air treatment persisted throughout the run, clearly an unexpected result since air treatment of catalysts otherwise similar except they do not contain selenium are known, and have been demonstrated to drastically reduce yield and activity.

Moreover, the first few hours of a reforming cycle are critical since at this stage excessive hydrogenolysis, or runaway hydrocracking can occur, this in turn increasing the temperature of the bed of catalyst which in turn can lead to more cracking; and this condition can result in reactor melt down. This condition, as stated, is manifested by excessive methane production and high yield of gas which, inter alia, reduces $C_5+$ liquid yield. These data, and that given in application Ser. No. 862,116 show, however, that platinum-iridium catalyts to which selenium had been added perform far better than a platinum-iridium catalyst which contains no added selenium. First, one observes a far greater C$_5$+ liquid yield and improved aromatics production and a further improved C$_5$+ liquid and aromatics yields. Conversely, one observes the reverse relationship in use of these catalysts as regards methane and gas yields. Moreover, the data show that the benefits or selenium are even more pronounced, and greater, when the selenium promoted catalyst is pretreated with oxygen.

It is apparent that various modifications and changes can be made without departing the spirit and scope of the present invention, outstanding features of which are that hydrogenolysis can be suppressed without the use of conventional catalyst presulfiding techniques, and the octane quality of hydrocarbon feedstocks upgraded and improved.

Having described the invention, what is claimed is:

1. In a process for preparing a reforming catalyst wherein a Group VIII noble metal hydrogenation-dehydrogenation component in concentration ranging from about 0.01 to about 3 percent, based on the weight of the catalyst, an iridium component in concentration ranging from about 0.01 to about 3 percent, based on the weight of the catalyst, a selenium component, in concentration ranging from about 0.01 to about 3 percent, based on the weight of the catalyst, and a halogen component in concentration ranging from about 0.1 to about 3 percent, based on the weight of th catalyst, are composited with an inorganic oxide support, the improvement which comprises contacting said catalyst with oxygen sufficient to increase its selectivity when used in reforming a hydrocarbon feed at reforming conditions.

2. In a process for preparing a reforming catalyst which comprises a platinum metal component in concentration ranging from about 0.01 to about 3 percent, based on the weight of the catalyst, an iridium component in concentration ranging from about 0.01 to about 3 percent, based on the weight of the catalyst, a selenium component, in concentration ranging from about 0.001 to about 3 percent, based on the weight of the catalyst, and a halogen component in concentration ranging from about 0.1 to about 3 percent, based on the weight of the catalyst, composited with an inorganic oxide support, the improvement which comprises contacting said catalyst with oxygen, or an oxygen-containing gas at elevated temperatures to improve the selectivity of the catalyst.

3. The process of claim 2 wherein the catalyst is treated by contact with air.

4. The process of claim 3 wherein the treatment with air is continued for a period ranging from about 0.1 to about 48 hours at temperatures ranging from about 300° F. to about 1200° F.

5. In a process for preparing a reforming catalyst which comprises a platinum metal component in concentration ranging from about 0.01 to about 3 percent, based on the weight of the catalyst, an iridium component in concentration ranging from about 0.01 to about 3 percent, based on the weight of the catalyst, a selenium component, in concentration ranging from about 0.001 to about 3 percent, based on the weight of the catalyst, and a halogen component in concentration ranging from about 0.1 to about 3 percent, based on the weight of the catalyst, composited with an alumina support, the improvement which comprises contacting said catalyst with oxygen, or an oxygen-containing gas at elevated temperatures to improve the selectivity of the catalyst.

6. The process of claim 5 wherein the catalyst is treated by contact with air.

7. A reforming catalyst useful for reforming a hydrocarbon feed at reforming conditions which comprises a Group VIII noble metal hydrogenation-dehydrogenation component in concentration ranging from about 0.01 to about 3 percent, based on the weight of the catalyst, an iridium component in concentration ranging from about 0.01 to about 3 percent, based on the weight of the catalyst, a halogen component in concentration ranging from about 0.01 to about 3 percent, based on the weight of the catalyst, and a selenium component in concentration ranging from about 0.001 to about 3 percent, based on the weight of the catalyst, sufficient to increase the activity or selectivity, or both, of the catalyst as contrasted with a catalyst otherwise similar except that it does not contain selenium, and the catalyst is contacted with oxygen sufficient to further increase its selectivity when used in reforming a hydrocarbon feed at reforming conditions.

* * * * *